United States Patent [19]

Hähnke et al.

[11] 4,041,054

[45] Aug. 9, 1977

[54] PROCESS FOR THE PREPARATION OF SYMMETRIC 4-HALOGEN-4',4''-DIARYLAMINO-TRIPHENYLMETHANE COMPOUNDS

[75] Inventors: Manfred Hähnke, Kelkheim, Taunus; Theodor Papenfuhs, Frankfurt am Main, both of Germany

[73] Assignee: Hoechst Aktiengesellschaft, Frankfurt am Main, Germany

[21] Appl. No.: 587,413

[22] Filed: June 17, 1975

[30] Foreign Application Priority Data

June 20, 1974 Germany .............................. 2429673

[51] Int. Cl.$^2$ .............................................. C09B 11/10
[52] U.S. Cl. ...................................................... 260/393
[58] Field of Search ........................................ 260/393

[56] References Cited

U.S. PATENT DOCUMENTS

| 3,112,326 | 11/1963 | Rudner et al. | 260/393 X |
| 3,211,757 | 10/1965 | Schäfer et al. | 260/393 |

*Primary Examiner*—Paul F. Shaver
*Attorney, Agent, or Firm*—Connolly and Hutz

[57] ABSTRACT

An improved process for the preparation of symmetric 4-halogeno-4',4''-diarylamino-triphenyl-methane compounds by reacting a complex compound of a 4,4',4''-trihalogeno-triphenyl-methyl-halide and aliminium-chloride, iron(III)chloride or bortrifluoride with an aromatic amine, which is substituted in m- or p-position to the amino group, at an elevated temperature had been found wherein 1 mol of the complex compound is reacted with more than 4 mol of the aromatic amine and the so obtained complex compound from 4-halogen-4',4''-diarylamino-triphenyl-methyl-halide and aluminiumchloride, iron(III)chloride or bortrifluoride is subsequently converted into the anhydro- or carbinol base of the dyestuff with the aid of an aqueous alkali metal hydroxide solution whereupon the salt of the dyestuff is precipitated by addition of an acid in excess.

This novel process obviates the formation of red mono- and blue tri-reaction products, the use of solvents and leads to very clean products which are very well suitable for spin-dyeing solutions.

6 Claims, No Drawings

PROCESS FOR THE PREPARATION OF SYMMETRIC 4-HALOGEN-4',4"-DIARYLAMINO-TRIPHENYLMETHANE COMPOUNDS

The present invention concerns an improved process for the preparation of symmetric 4-halogen-4',4"-diarylamino-triphenyl-methane compounds.

It is already known that it is possible to prepare symmetric 4-halogen- 4',4"-diarylamino-triphenylmethane compounds by reacting one mol of a complex compound of a 4,4',4"-tri-halogenotriphenyl-methyl-halogenide and aliminiumchloride, iron(III)-chloride or bortrifluoride with about 4 mols of an aromatic amine, which is substituted in m- or p-position to the amino group, in the presence of an indifferent organic solvent at a temperature of from about 100° and 150° C, preferably of from about 115° and 125° C. The complex salts of the symmetric 4-halogen-4', 4"-diarylamino-triphenylmethane compounds, which were firstly obtained after the reaction, are converted into the corresponding symmetric 4-halogeno-4',4"-diarylamino-triphenyl-methyl-halogenides by hydrolysis with diluted hydrochloric acid (see also German Patent Specification No. 1,161,371).

However, this well known process presents some defects: the 4,4',4"-trihalogeno-triphenylmethyl-tetrachloroaluminates, -tetrachloroferrates and-chlorotrifluoroborates are obtained in the solvent used as crystalline substances beside position isomeric compounds and have to be isolated by filtration and to be washed. Due to the hydrolysis-sensibility, a determination of yield by drying in air is not possible. However, a precise determination is indispensible in this process, because, in the case of underdosing of the aromatic amine, which is used subsequently in the reaction, unstable, red monoreaction products of the 4,4', 4"'-trihalogen-triphenylmethyl compounds are obtained and, in case of overdosage, the blue tri-reaction products thereof are formed.

Furthermore, the indifferent solvent used in the known process, is eliminated by steam-distillation from an acid aqueous suspension of the dyestuff halogenide which leads, in most of the cases, to an adhesive agglutination rendering difficult the stirring and filtration process.

An other disadvantage of this known process is, that the so obtained dyestuff halogenides still containing even after the acid hydrolytic waste-up process relatively high amounts of inorganic salts. When using such dyestuffs in the form of solution in organic solvents, such as, for example, for spin-dyeing of acid-modified polyacrylonitrile from a solution in dimethylformamide, inconveniences arise from the insolubility of the inorganic salts therein contained.

Now it was found, that these disadvantages, arising in the course of the preparation at elevated temperatures of symmetric 4-halogeno-4',4"-diarylamino-triphenyl-methane compounds by conversion of a complex compound of a 4,4',4"-trihalogeno-triphenylmethyl-halogenide and aluminiumchloride, iron(III)-chloride or bortrifluoride with an aromatic amine, which is substituted in m- or p-position to the amino group can be avoided if a 1 mol of the complex compound is reacted with more than 4 mols of the aromatic amine; the so obtained complex compound from 4-halogeno-4',4"-diarylamino-triphenyl-methylhalogenide and aluminiumchloride, iron(III)-chloride or bortrifluoride is subsequently converted into the anyhdro- or carbinol base of the dyestuff with the aid of an aqueous alkali metal hydroxide and then the salt of the dyestuff is precipitated by the addition of acid in excess.

According to the process of the invention, the complex salt which is destined for the reaction and which is available in a halogenobenzenic solution or suspension or as halogeno-benzene-moisty filter cake, has not to be defined precisely in its quantity, as the reaction is not effected with a stoichiometric quantity but with an excess amount of the aromatic amine. The reaction temperature is lower than in the known process.

The reaction temperature is chosen in such a way that only a reaction for the obtention of green 4-halogeno-4',4"-diarylamino-trityl compounds is ascertained without formation of blue 4,4',4"-triarylamino-trityl compounds. This temperature is generally in the range of from about 70° to 110° C, preferably in the range of from about 80° to 100° C.

As aromatic amine, which is used in excess, 4.2 to 10 mols, preferably 5–8 mols related to 1 mol of the complex compound to react with this aromatic amine, is added to the reaction mixture.

It is advantageous to separate the halogenobenzene by distillation in vacuo in the course of the reaction. After the reaction, the reaction mass is decomposed under heat with an aqueous alkaline liquor in excess, especially with caustic soda, whereby the resulting alkali-aluminate and the alkali-halogenide enter into the aqueous phase and the dyestuff, in form of the anhydro- or carbinol base, is dissolved in the phase of the excess of the aromatic amine. Afterwards, the organic phase is stirred into an aqueous acid, whereby the dyestuff-salt of that acid precipitates in coarse-grained, well filterable crystals; the aromatic amine remains in the acid, aqueous phase wherefrom it can be reobtained.

It is also possible to abstain from distillation of the organic solvent during the dyestuff melt but to overdraw the solvent with steam in the course of the subsequent decomposition.

The complex compounds used as starting products are 4,4',4"-trihalogeno-triphenylmethyl-tetrachloroaluminates, -ferrates or chlorboro-trifluorides. The aromatic amines, substituted in m- or p-position to the amino group, preferably aniline derivatives and naphthylamines, carry in one of the beforementioned positions an halogen atom such as a chlorine, bromine or fluorine atom, an alkyl group, preferably an alkyl group with 1 to 6 carbon atoms, an alkoxy group, preferably an alkoxy- or an alkoxylalkoxy group with 1 to 6 or, respectively, 2 to 8 carbon atoms, a hydroxy, a phenylamino or a phenylamino group substituted by chlorine, methyl, ethyl, methoxy, ethoxy, sulfonamide, nitro, cyano, trifluoromethyl and/or hydroxy groups, a phenyl or naphthyl radical, a trifluoromethyl, cyano or nitro group. Furthermore, these arylamines may contain other substituents in the aromatic nuclei such as, for example, the beforementioned halogen atoms, alkyl, alkoxy, phenylamino, hydroxy, trifluoromethyl, cyano and nitro groups.

Suitable for the precipitation of the dyestuff salts are hydro halogeno acids, preferably hydrochloric acid, sulfuric acid, nitric acid, phosphoric acid or organic acids, such as acetic acid, propionic acid, lactic acid or tartaric acid.

According to the process of the invention, dyestuffs are obtained, which are to a large extent free from organic byproducts and inorganic salts. The absence of salts is particularly a conditio sine qua non for their utilization in spin-dyeing of polyacrylonitrile.

The dyestuffs obtained according to the invention are suitable for dyeing and printing of polymers which contain acid groups, for example, acid-modified polyesters, polyamides or polyacrylonitriles as well as, in after-sulfated form, for dyeing of wool, silk and polyamide fibers.

The process of the invention is also suitable for the preparation of mixtures of 4-halogeno- and halogeno-4',4''-diarylamino-triphenyl-methane compounds.

Especially interesting compounds, which can be prepared according to the process of the invention in high purity are those, which correspond to the following general formula

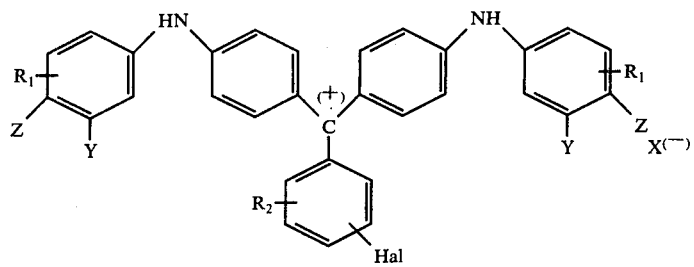

in which Y stands for a hydrogen, chlorine or bromine atom or for an alkyl group with 1-4 carbon atoms or for an alkoxy group with 1 to 4 carbon atoms or for a trifluoromethyl, hydroxy, nitro, cyano, phenylamino, chlorophenylamino, methylphenylamino or ethylphenylamino group, Z stands for a hydrogen atom, a chlorine or bromine atom, for an alkyl group with 1-4 carbon atoms, for an alkoxy group with 1-4 carbon atoms, for a trifluoromethyl, hydroxy, nitro, cyano, phenylamino, chlorophenylamino, methylphenylamino or ethylphenylamino group, whereby however, Y is not a hydrogen atom, if Z stands for a hydrogen atom, and Z does not stand for a hydrogen atom when Y stands for it; $R^1$ and $R^2$ are identical or different, each representing a hydrogen, chlorine or bromine atom or an alkyl group of 1-4 carbon atoms or an alkoxy group of 1-4 carbon atoms, a trifluoromethyl, cyano, nitro, hydroxy, phenylamino, chlorophenylamino, methylphenylamino or ethylphenylamino group; Hal stands for a chlorine or bromine atom and $X^{(-)}$ for an anion.

The following examples illustrate the invention. Parts and percentages indicated represent parts and percentages by weight.

EXAMPLE 1

To 20 parts of a chlorobenzenic suspension of 33%, which contain 2,4',4''-trichloro-triphenylmethyl-tetrachloroaluminate and 4,4',4''-trichloro-triphenylmethyl-tetrachloroaluminate in a ratio of about 3 : 1, 8 parts of m-toluidine were added at room temperature, whereby the temperature was raising up to about 60°-70° C. Heating was continued up to 83°-85° C and, at the same time, the chlorobenzene together with a little amount of m-toluidine was separated by distillation in a vacuum of 10-15 Torr. After 5 hours, the distillation was brought to an end at 83°-85° C; the reaction mass was stirred onto 15 parts of a 25% aqueous sodium hydroxide solution, of 70° to 80° C, whereby boiling temperature was reached by self-heating.

After 10-20 minutes, stirring was stopped and the phases were separating. The lower phase was rejected, to the upper phase 8 parts of water were added and washed during 10-20 minutes at 70°-80° C. At this stage, the upper phase was rejected. The lower phase was filtered under heat and was stirred afterwards onto 40 parts of an 25% aqueous sulfuric acid of 40° C, whereby, under self-heating to 50°-55° C of the solution, the dyestuff of the formula shown below was precipitating after a short time.

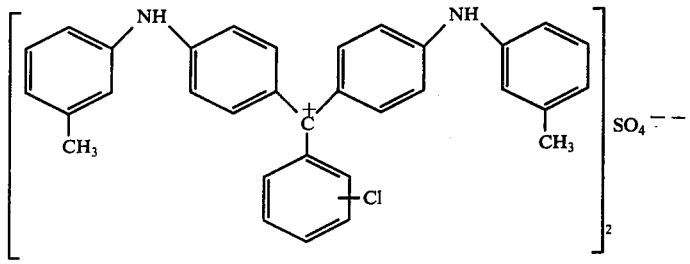

After 2 hours, the dyestuff (4.5 parts) was suction-filtered from the warmed mother liquor, washed with water and dried at 60° C; it is soluble in dimethylformamide without residue with a deep green shade.

0.5 parts of the dyestuff were stirred into 100 parts of a 28% solution, heated at 80° C, of an acid modified polyacrylo-nitrile in dimethyl-formamide whereby an absolutely clear spinning solution was obtained. When spinning this solution according to usual and known methods, dry- or wet spin process, a deep green fibre material was obtained, which excells by a high brightness and excellent fastnesses, especially to light and to wet.

EXAMPLE 2

The preparation was carried out according to example 1, but with the difference, that the chlorobenzene is not distilled off in vacuo in the course of the reaction but over-drawn with steam during its treatment with the aquous sodium hydroxide solution.

In this process, the temperature raised up to 88°-90° C in the course of the reaction with m-toluidine.

EXAMPLE 3

Whilst stirring, 5.15 parts of 4,4',4''-trichloro-triphenyltetrachloroaluminate were slowly added to 7.5 parts of m-chloroaniline; the reaction mixture was then heated up to 90° C.

After 6 hours, it was poured at this temperature onto 12 parts of an aqueous 25% sodium hydroxide solution of 70°–80° C, and stirring was continued at boiling temperature for 10–20 minutes. The organic phase formed was washed with hot water, filtered in the hot state and subsequently stirred at 40° C onto 40 parts of an aqueous 10% hydrochloric acid. Suction-filtering, washing with water and drying at 60° C takes place after 2 hours, 5.5 parts of a green dyestuff clearly soluble in dimethyl-formamide were obtained corresponding to the formula

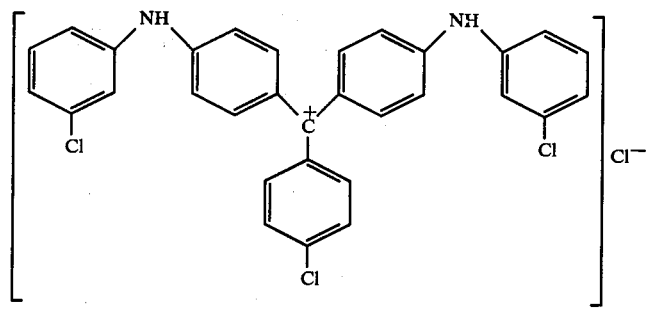

0.5 parts of the dyestuff were stirred into 100 parts of a 25% solution of an acid modified polyacrylonitrile in dimethyl-formamide, which was heated to 80° C, whereby an absolutely clear, green spinning solution was obtained. When spinning this solution according to an usual and known dry or wet spinning process, a deep green fibre material was obtained which excells by an outstanding brightness and excellent fastnesses, especially as to light and to wet processings.

If the m-toluidine, used in example 1, is replaced by one of the aromatic amines shown in the table hereafter, the corresponding green dyestuffs were obtained indicated herein as "end-products", with the same yield and high purity.

| Starting Amine | End-product |
|---|---|

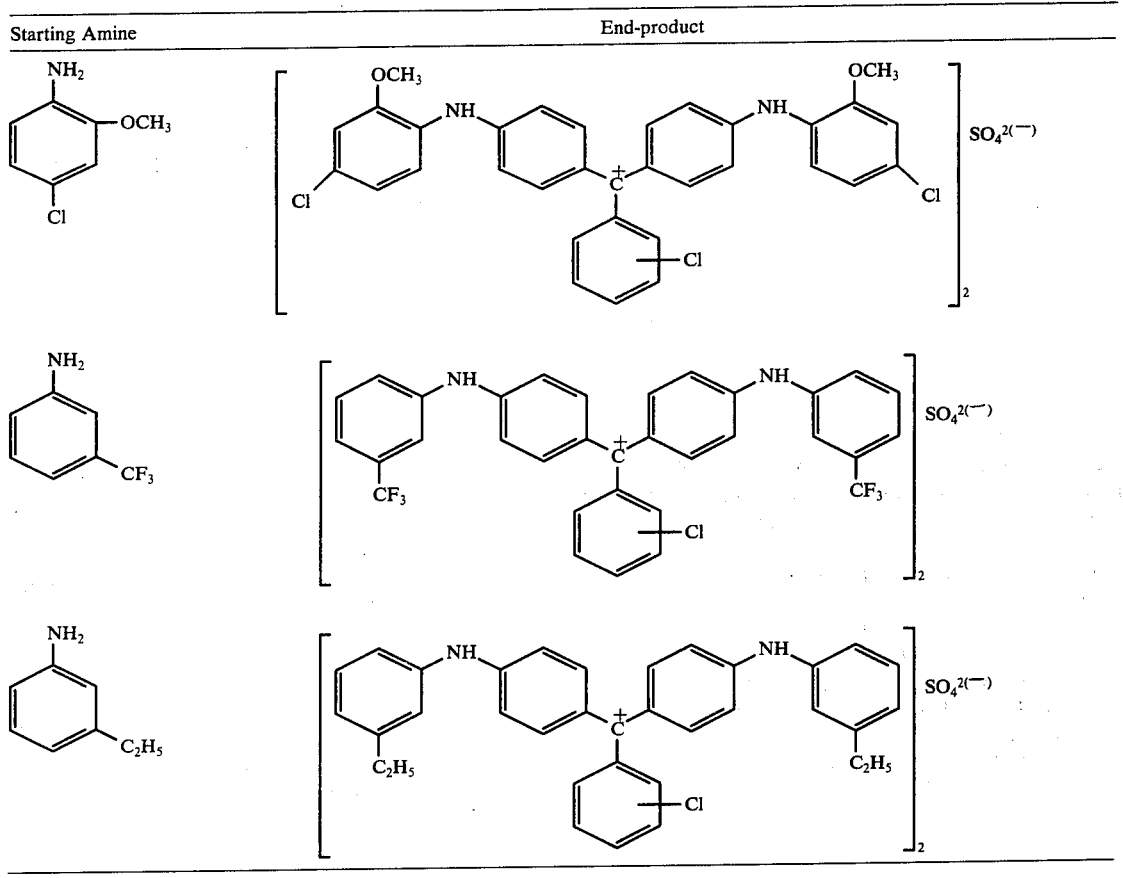

0.5 parts of one of the dyestuffs were stirred into 100 parts of a 28% solution of an acid modified polyacrylonitrile in dimethylformamide, which was heated to 80° C, whereby an absolutly clear, green spinning-mass was obtained. When spinning this solution according to usual and known dry or wet spinning processes, a deep green fibre material was obtained, which excells by an outstanding brightness and excellent fastnesses, especially as to light and to wet processing.

We claim:

1. In a process for the preparation of symmetric 4-halogeno-4',4''-diarylamino-triphenyl-methane compounds by reacting a complex compound of a 4,4',4''-trihalogeno-triphenylmethyl-halide and aluminum chloride, iron-(III) chloride or bortrifluoride with an aromatic amine which is substituted in m- or p-position to the amino group, at an elevated temperature, the improvement comprises reacting 1 mol of the complex compound with 5-8 mols of the aromatic amine at a temperature of from about 80° to 100° C in a halobenzene as solvent, and subsequently converting the so obtained complex compound from 4-halogeno-4',4''-diarylamino-triphenyl-methyl-halide and aluminum chloride, iron-(III) chloride or bortrifluoride first into the anhydro- or carbinol base of the dyestuff with the aid of an aqueous alkali metal hydroxide solution and then precipitating the salt of the dyestuff by addition of an acid in excess.

2. A process according to claim 1, in which the organic phase, treated with aqueous alkali hydroxide, which contains the anhydro- or carbinol base as solution in the aromatic amine, is separated from the aqueous phase; the dyestuff salt is then precipitated.

3. A process according claim 1, in which an inorganic or organic acid is used for the precipitation of the dyestuff-salt, which is capable of forming with the amine in excess a hydrosoluble salt.

4. A process as claimed in claim 1, wherein a mixture of a 4- and a 2-halogen-4',4''-diarylamino-triphenylmethane compound is prepared, characterized thereby, that a mixture of a 4,4',4''- and a 2,4',4''-trihalogeno-triphenyl-methyl-halogenide complex were used.

5. A process according to claim 4, in which the mixture of a 2,4',4''- and a 4,4',4''-trihalogeno-triphenyl-methyl-halogenide-complex is used as a solution or as a suspension in the halogenobenzene used in the preparation process and wherein the halogenobenzene is separated by distillation in the course of the reaction with the aromatic amine or during the treatment with the aqueous alkalihydroxide.

6. A process, as claimed in claim 1, in which compounds of the formula

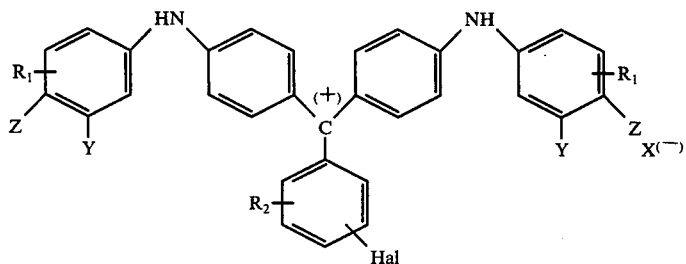

are obtained in which Y is hydrogen, chlorine or bromine or alkyl of 1–4 carbon atoms or alkoxy group of 1 to 4 carbon atoms or trifluoromethyl, hydroxy, nitro, cyano, phenylamino, chlorophenylamino, methylphenylamino or ethylphenylamino, Z is hydrogen, chlorine, bromine, alkyl of 1–4 carbon atoms, alkoxy of 1–4 carbon atoms, trifluoromethyl, hydroxy, nitro, cyano, phenylamino, chlorophenylamino methylphenylamino or ethylphenylamino, whereby Y is not hydrogen, if Z is hydrogen and Z not hydrogen if Y is hydrogen, $R^1$ and $R^2$ are identical or different and each is hydrogen, chlorine or bromine, alkyl of 1-4 carbon atoms, alkoxy of 1-4 carbon atoms, trifluoromethyl, cyano, nitro, hydroxy, phenylamino, chlorophenylamino, methylphenylamino or ethylphenylamino, Hal is chlorine or bromine and $X^{(-)}$ is an anion.

* * * * *